United States Patent [19]
Ehret

[11] 4,200,783
[45] Apr. 29, 1980

[54] APPARATUS FOR COLLECTING AND THERMALLY STORING ENERGY

[76] Inventor: Boyd P. Ehret, 4059 Douglas Dr., Crystal, Minn. 55422

[21] Appl. No.: 816,475

[22] Filed: Jul. 18, 1977

[51] Int. Cl.² .................... F24H 7/02; H05B 1/00; F24D 11/00
[52] U.S. Cl. .................... 219/365; 60/641; 126/430; 126/400; 165/104 S; 219/325; 219/341; 219/378; 290/2
[58] Field of Search ............ 219/378, 365, 341, 325, 219/326, 327, 302, 530, 540; 136/89 PC; 126/270, 271, 400; 320/2; 60/641; 237/1 A; 165/18, 104, 106, 107; 290/2, 44

[56] References Cited

U.S. PATENT DOCUMENTS

| | | | |
|---|---|---|---|
| 1,069,371 | 8/1913 | Bell et al. | 219/302 |
| 1,790,555 | 1/1931 | Plumb | 219/326 UX |
| 1,979,083 | 10/1934 | Singer | 219/378 UX |
| 2,579,311 | 12/1951 | Fairey | 290/2 |
| 2,911,513 | 11/1959 | MacCracken | 219/326 |
| 2,946,945 | 7/1960 | Regnier et al. | 60/641 X |
| 3,533,758 | 10/1970 | Lowe et al. | 219/378 X |
| 3,596,034 | 7/1971 | Mekjean | 219/378 X |
| 3,624,356 | 11/1971 | Havill | 219/378 |
| 3,841,302 | 10/1974 | Falbel | 219/378 UX |
| 3,888,303 | 6/1975 | Skala | 165/18 X |

FOREIGN PATENT DOCUMENTS

| | | | |
|---|---|---|---|
| 500788 | 1/1920 | France | 219/327 |
| 1322119 | 2/1963 | France | 219/325 |
| 1474860 | 2/1967 | France | 219/325 |
| 471879 | 12/1935 | United Kingdom | 219/378 |
| 1160082 | 7/1969 | United Kingdom | 219/378 |

OTHER PUBLICATIONS

Proceedings of the Workshop on Solar Energy Storage Subsystems for Heating and Cooling of Buildings, Charlotteville, Va., Apr. 16–18, 1975, Copyright 1975 by American Society of Heating, Refrigerating and Air Conditioning Engineers, Inc., p. 154.

Primary Examiner—A. Bartis
Attorney, Agent, or Firm—Williamson, Bains, Moore & Hansen

[57] ABSTRACT

An apparatus for collecting and storing energy includes a thermal energy storage cell having a single-piece steel inner core provided with external thermal insulation. A unit for collecting and converting non-electrical energy into electrical energy, such as a solar cell unit, is connected to electrical resistance heating elements within the inner core for heating the latter to a temperature in excess of 1,000° F. Heat energy stored in the inner core is transferred to a heat transfer liquid, such as synthetic oil, which is circulated through a conduit having heating coils within the inner core. The heat transfer liquid, which remains in a liquid condition when heated to a temperature in excess of 1,000° F., is used in heat utilizing systems such as the heating system of a house.

6 Claims, 2 Drawing Figures

APPARATUS FOR COLLECTING AND THERMALLY STORING ENERGY

SUMMARY OF THE INVENTION

This invention relates to a thermal energy storage cell.

An object of this invention is to provide a novel thermal energy storage cell, of simple and inexpensive construction, including a inner core formed of a solid piece of steel to which energy is transferred from an electrical generating device such as a solar cell unit.

More specifically, the inner steel core of the thermal energy storage cell is enclosed in thermal insulation and is heated to a temperature in excess of 1000° F. by resistance heating elements electrically connected to an electrical generating device such as a solar cell unit. Heat energy stored with the storage cell is then transferred to heat transfer liquid; such as synthetic oil, which is circulated through a conduit having heating coils within the inner core. The heat transfer liquid, which remains in a liquid condition at temperatures in excess of 1000° F., may then be used in any heat utilizing system such as the heating system of a house.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a diagrammatic cross-sectional view of a building in which is disposed my novel thermal energy stored heat may be distributed, and FIG. 2 is a prospective view of the novel thermal energy storage cell with certain parts thereof broken away for clarity.

DESCRIPTION OF THE PREFERRED EMBODIMENT

Figure 1:
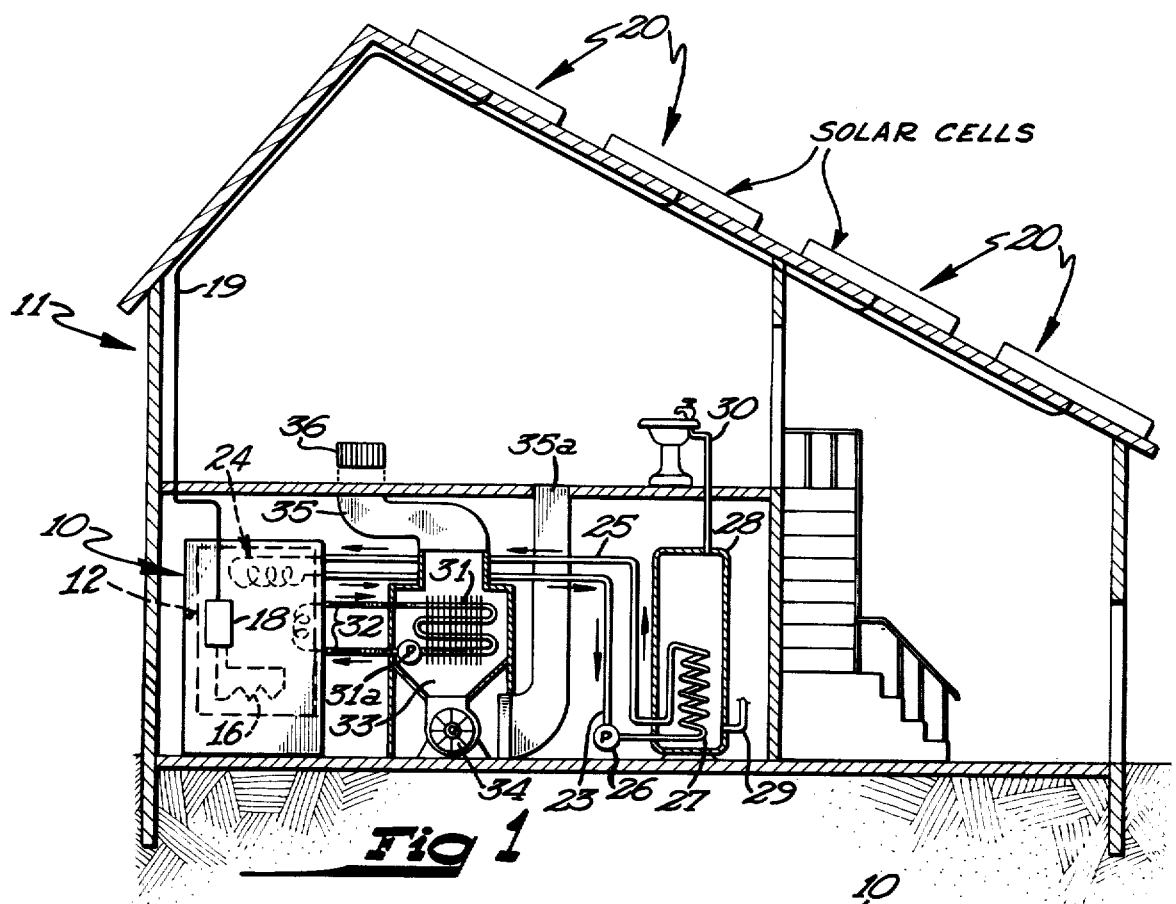
Figure 2:
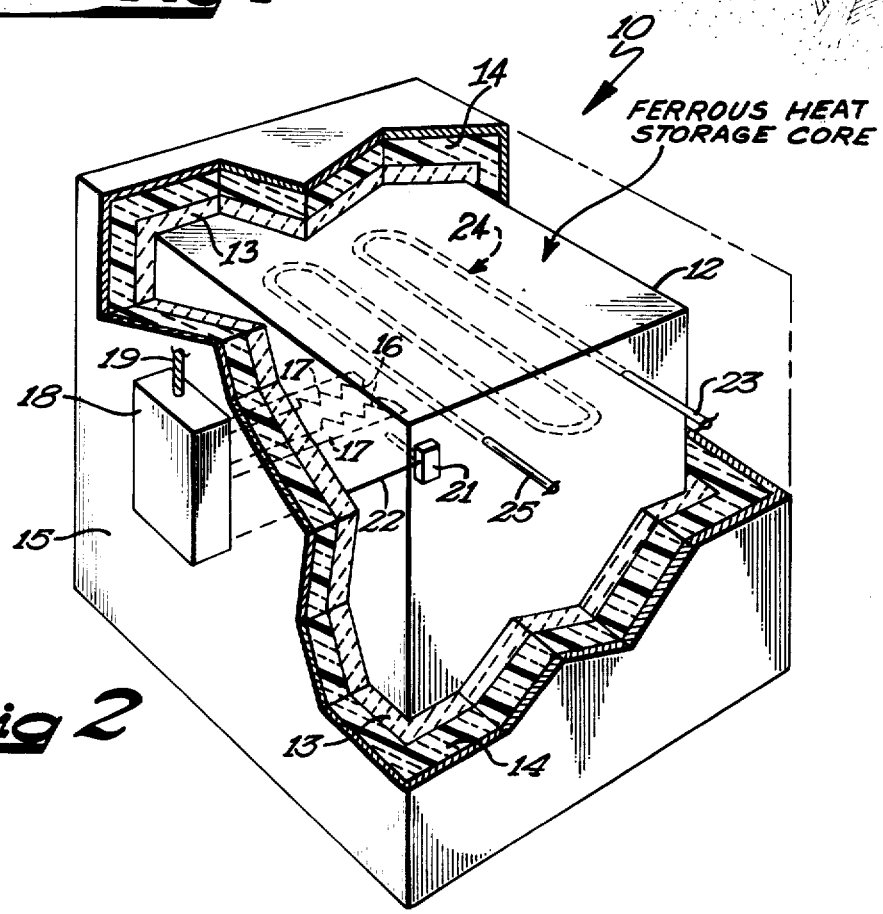

Referring now to the drawings and more specifically to FIG. 1, it will be seen that one embodiment of the novel thermal energy storage cell, designated generally by the reference numeral 10, is illustrated in a house or building 11. As shown in FIG. 2, the thermal energy storage cell 10 is comprised of ferrous heat storage core 12 which is formed of a ferrous material, preferably mild steel. The inner core may be of single pieced construction, as shown in FIG. 2, or may be formed of sections which are secured together by any suitable means.

The inner core is provided with external thermal insulation including an inner layer 13 formed of refractory material, such as fire brick. The inner layer of refractory material is covered by an outer layer 14 formed of fiberglass type insulation. A steel jacket 15 completely encases the external insulation as well as the ferrous core 12. In the embodiment shown, it will be noted that the thermal energy storage cell as well as the components thereof are of generally rectangular configuration. However, it is pointed out that the thermal energy storage cell as well as the individual components may be of other shapes.

Electrical resistance heating elements 16 are disposed within the ferrous core 12 and have contact with the interior thereof. These resistance heating elements 16 are connected by suitable conductors 17 to a control junction box 18 which may be mounted on the exterior jacket 15 of the storage cell. Electrical conductors 19 electrically connect the electrical resistance heating elements through the junction box 18 to an electrical generating device such as the solar cell units 20 which are located exteriorly of the house 11 and which receive and convert solar energy into electrical energy. Other electrical generating devices such as wind mills, water wheels, heat energy systems which convert kinetic energy or other energy into electrical energy may be used. A thermostat sensor 21 is positioned within the inner core 12 and is connected by suitable conductor 22 to the junction box 18. The sensor serves to control the supply of current to the inner core 12 in response to a predetermined heat level. Although the location of the solar cells 20 is on the roof of the house 11, these photo cells may be positioned in a location which is suitable for collecting solar energy.

An inlet or supply conduit line 23 is connected to a source of liquid under pressure and supplies transfer liquid to heating coils 24 positioned within the ferrous core 12 whereby the liquid will be heated by the stored heat within the ferrous core 12. The heating coils 24 are connected to an outlet or a heated pipe line 25 through which heated liquid passes to a heat using system. The liquid used to transfer heat energy must be capable of remaining in a liquid state at high temperatures. Since the inner core will reach temperatures in excess of 1000° F., it is necessary that the heat transfer liquid be capable of relatively high temperature ranges in a liquid state. Any of the well known commercially available synthetic oils capable of remaining liquid at such temperature ranges may be used as the heat transfer liquid.

Referring now to FIG. 1, it will be noted that the inlet conduit 23 and the outlet conduit 25 are connected to the heating coils 27 in a hot water heater 28. A pump 26 is interposed in the inlet conduit 23 and supplies liquid under pressure to the heating coils 24 within the ferrous core. Thus, heat transfer liquid is circulated through the conduits 23 and 25 to heat water within the water heater 28. In this respect, the hot water heater 28 is provided with an inlet or a cold water supply line 29 and a hot water outlet line 30. Thus, it will be seen that heat from the solar energy storage cell may be used to heat hot water for domestic use.

A conduit 32 having heating coils within the inner core 12 is connected to a finned radiator coil 31 which is positioned within a heating chamber 33. A pump 31a is disposed in flow controlling relation within the conduit 32 and circulates the heat transfer liquid through the conduit and through the finned radiator coils 31. Therefore, liquid circulated through the heating coils of the conduit 32 will be directed into the radiator coils 31 where heat will be radiated therefrom into the heating chamber 33. A squirrel cage blower 34 circulates air over the radiator coils into a hot air supply conduit 35 which is provided with an outlet 36 communicating with the interior of the house 11. A return conduit 35a returns unheated air to the heating chamber 33. It will therefore be seen that liquid circulated through the thermal energy storage cell 10 will be heated and directed through radiator coils for supplying heat to the building 11.

The size of the heat energy storage cell 10 will be dependent on the requirements or demands of heat to be used. Large demands of heat energy will necessarily require a large storage cell. The storage cell may be located in any convenient location within a building, such as a basement of a conventional house. Because of its simple construction, the storage cell requires little maintenance although it is extremely efficient in storing heat. The storage cell may be used with any conventional electrical energy generating system, such as the solar cell units 20 mounted on the roof of a house 11.

Thus, it will be seen that I have provided a novel thermal energy storage cell which is not only of simple and inexpensive construction, but one which functions in a more efficient manner than any heretofore comparable storage cell.

What is claimed is:

1. Apparatus for collecting and storing energy comprising:
    a unit for collecting and converting non-electrical energy into electrical energy,
    a thermal energy storage cell for storing thermal energy comprising an inner, metallic core formed of a solid piece of ferrous material,
    external thermal insulation engaging and enclosing the metallic core,
    electric heating means within said core capable of heating said core to a temperature of at least 1,000° F.
    conductor means electically connecting said heating means and said energy collecting unit for supplying electrical energy produced by said unit to said heating means, said conductor means including temperature control means for controlling the supply of current to said heating means, said control means permitting said heating means to heat said metallic core to a temperature of approximately 1,000° F., said core remaining in a solid, dimensionally stable condition during heating thereof, to said temperature,
    conduit means extending between and interconnected with said inner metallic core and heat utilizing system, for circulating a heat transfer liquid therebetween, said conduit means including a heat input coil portion thereof disposed within said inner metallic core, and a heat output portion associatd with said heat utilizing means,
    a heat transfer liquid within said conduit means, said heat transfer liquid having a boiling point above 1,000° F.,
    means connected with said conduit means for circulating said transfer liquid through said conduit means between said metallic core and the heat utilizing system whereby said transfer liquid will be heated by said metallic core, said heat transfer fluid remaining in a liquid condition when heated by the metallic core to a temperature of approximately 1,000° F.

2. The invention as defined in claim 1 wherein said inner metallic core is formed of steel.

3. The invention as defined in claim 2 wherein said electric heating means comprises an electrical resistance heater.

4. The invention as defined in claim 3 wherein said thermal insulation includes a plurality of layers of thermal insulator material.

5. The invention as defined in claim 1 wherein said heat transfer fluid comprises a synthetic oil.

6. The invention as defined in claim 1 wherein said energy collecting unit comprises a solar cell unit.

* * * * *